May 3, 1955    J. R. LEIBOWITZ    2,707,719
APPARATUS FOR THE VACUUM MELTING OF HIGH PURITY MATERIALS
Filed April 23, 1954
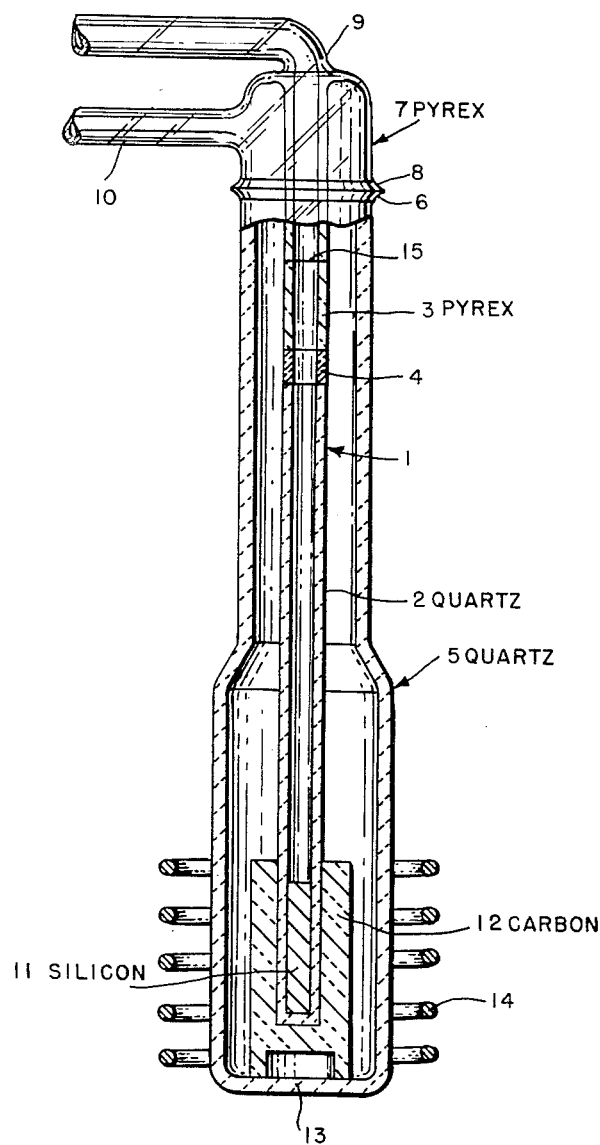
INVENTOR.
JACK R. LEIBOWITZ
BY
ATTORNEY

United States Patent Office 2,707,719
Patented May 3, 1955

2,707,719

APPARATUS FOR THE VACUUM MELTING OF HIGH PURITY MATERIALS

Jack Richard Leibowitz, Asbury Park, N. J., assignor to the United States of America as represented by the Secretary of the Army Application April 23, 1954, Serial No. 425,339

2 Claims. (Cl. 13—31)

(Granted under Title 35, U. S. Code (1952), sec. 266)

The invention described herein may be manufactured and used by or for the Government for governmental purposes without the payment of any royalty thereon.

This invention relates to an apparatus for vacuum melting of high purity materials and more particularly to the vacuum melting of silicon to be used as transistor material.

It has been known that silica or quartz of high purity is an excellent material for crucibles or tubes in which to perform the melting of high purity silicon. However, in melting silicon in a quartz tube or crucible the melted silicon combines at the interphase with the quartz container to form compounds which have a coefficient of expansion different from that of the quartz thus causing cracking of the very expensive quartz container on cooling of the system which may be either an evacuated system or a system under the pressure of an inert gas.

An evacuated system is to be preferred since even the so-called "pure" inert gases are an important source of impurities. There are, however, less operational hazards in the use of such gases because there will be only a small pressure change in the system if fracture of the quartz tube occurs. If cracking occurs under vacuum large amounts of impurities will reenter into the already purified silicon material due to the rapid pressure change and the quartz container as well as the energy and labor spent on purifying the silicon are lost.

The present invention combines the advantages of both systems by providing an independently evacuated outer envelope which serves to preserve the high vacuum in the inner quartz container even if cracking should occur. The vaccum in the outer protective envelope effectively prevents rapid pressure changes and the reentering of impurities into the already purified silicon.

It is an object of this invention to overcome the serious drawbacks that prevent speedy and inexpensive manufacture of high purity materials. Another object of this invention is to prevent loss of the purified material even if the quartz container should crack or break on cooling.

These and other objects of the invention are attained by an apparatus that consists essentially of an inner tube connected to an air-evacuating system and an outer concentric envelope connected to a separate air-evacuating system. The apparatus according to the invention is constructed in such a manner that even if the inner tube that contains the melt should crack on cooling, the independent vacuum in the concentric envelope will prevent contamination of the already purified material.

The invention will become more apparent from the description of an apparatus embodying the invention and shown in cross-section in the accompanying drawing.

The inner tube 1 of this apparatus consists of a lower section 2 made from high purity quartz and an upper section 3 made from Pyrex glass, a low expansion borosilicate glass. The two sections 2 and 3 are united in known manner by a so-called "graded seal" 4.

Enclosing the section 2 of the inner tube 1 is a quartz envelope 5 the open end of which carries a ground glass flange 6. A Pyrex dome 7 with ground glass flange 8 serves to hermetically seal the outer envelope 5. The dome 7 is fused to the upper part 9 of the Pyrex section 3 of the inner tube 1; the dome 7 and tube 1 form an integral part. The upper end 9 is directly connected to an evacuating system (not shown in the drawing) while a tube 10 extends from dome 7 so as to connect the outer envelope 5 to another separate and independent evacuating system (not shown) so that both the inner tube 1 and the outer envelope 5 can be evacuated independently of each other.

The silicon material 11 or any other material to be purified is placed in the lower part of the quartz tube 2. This lower part of the quartz tube 2 is in contact with a carbon bucket 12 that rests on the bottom 13 of the envelope 5. The carbon bucket 12 is heated by radio frequency induction heat with the aid of coil 14. Preferably the side walls of the bucket 12 are elongated to extend over the bottom so as to keep the bottom of the inner tube a short distance above the bottom of the outer envelope.

The above described apparatus is used in the following manner:

At the start the graded seal 4 connects the quartz tube 2 only with a short Pyrex tube that ends at the line indicated by 15.

In the specific embodiment of the new apparatus as shown in the drawing the inner tube 1 has a diameter of ⅝" and the length of the outer envelope 5 is about 16". The lower part of the quartz tube 2 of such apparatus is first filled with about 40 grams of high purity silicon in pulverized form and the tube is then sealed at 15 to the upper part 9 of the Pyrex section 3 which is fused to the dome 7. The dome 7 is then sealed to the outer envelope 5 by a wax seal (not shown in the drawing) which seals the ground glass flanges 6 and 8 together. The inner tube 1 and the outer envelope 5 are then independently evacuated, both to a vacuum of about $10^{-5}$ mm.

The radio frequency induction heat is then slowly applied until the carbon bucket reaches a temperature of about 900° C. as determined by an optical pyrometer. This temperature is maintained for about one and one half hours so that all volatile contaminations may be removed. The temperature is then increased, again slowly in small stages, until the melting point of silicon (about 1430° C.), is reached and this temperature is maintained for about one-half hour to remove the more tenacious impurities. Some of the contaminations that are of lower volatility than silicon will of course remain and must be removed by standard physical techniques (e. g. zone segregation) which can be performed in the same apparatus in conventional manner.

After the desired degree of purity has been attained the temperature is very slowly reduced. The decrease in temperature should be particularly slow for the first two hours in which period the temperature should not be brought down for more than about 200° C. to minimize the danger of cracking at the interphase between quartz and silicon. During the following two hours the temperature is then further decreased slowly by about 300° C. after which period the induction heating is disconnected and the furnace permitted to arrive at the ambient temperature.

During the entire operation the wax seal between flanges 6 and 8 is air-cooled to prevent softening.

To remove the silicon charge after cooling it is simply necessary to break the wax seal between the flanges 6 and 8 and to cut the Pyrex section 3 anywhere above the graded seal 4, for instance, at the line 15, and the ingot of purified silicon may then be taken out. Sometimes the ingot will adhere very firmly to the quartz which will require the cutting of the lower end portion of the quartz section 2 above the level of the ingot. For the next run that quartz part must of course be replaced by a new piece of quartz tube.

The apparatus according to the present invention has the following advantages:

It affords a very convenient method for purifying silicon or similar materials by vacuum-firing. In case of fracture of the inner quartz tube during the processing, the presence of the evacuated outer envelope insures the maintenance of high vacuum and thus prevents re-contamination of the purified material. The new apparatus greatly reduces costs since only those parts which are exposed to the highest temperatures are made from quartz while the other parts are made from the much less expensive Pyrex glass. The combination of quartz and Pyrex does not complicate the apparatus as could be expected; on the contrary it facilitates the handling both at the beginning and at the end of the operations, because it is much easier to cut and re-seal Pyrex glass than quartz. Finally there is an inherent advantage in the arrangement of the carbon bucket within a vacuum and out of contact with the silicon; the impurities contained in the carbon cannot reach the material to be purified and the carbon heater itself is protected from deterioration which would occur if the carbon would be maintained at such high temperatures under a normal atmospheric pressure.

The apparatus according to the invention may be employed not only for vacuum melting of various materials to be used as transistor materials but also for such known techniques as zone segregation, single crystal growth and the like.

It will be apparent to those skilled in the art that the invention is not limited to the described and illustrated embodiments since many modifications in the structure of the apparatus are conceivable within the inventive idea as claimed in the appended claims.

What is claimed is:

1. In an apparatus for vacuum melting of high purity materials comprising an inner tube connected to a first air-evacuating system, an outer envelope concentrically surrounding the inner tube and connected to a second air-evacuating system which is independent of said first evacuating system, an induction heating element provided in the bottom part of said envelope and surrounding the lower part of the inner tube, said inner tube consisting of a lower section made from high purity quartz and an upper section made from Pyrex glass, said sections being fused together by a graded seal, said outer envelope comprising two sections, the lower section consisting of high purity quartz, the upper section consisting of Pyrex glass, said Pyrex glass section of the outer envelope being integral with the Pyrex glass section of said inner tube.

2. In an apparatus for vacuum melting of high purity materials according to claim 1 in which said induction heating element consists of a carbon bucket having elongated side walls that extend over the bottom of said bucket so as to keep the bottom of the inner tube a short distance above the bottom of the outer envelope.

References Cited in the file of this patent

UNITED STATES PATENTS

| Re. 13,849 | Simpson | Dec. 15, 1914 |
| 1,915,700 | Tama | June 27, 1933 |
| 2,039,165 | Hayakawa | Apr. 28, 1946 |
| 2,442,968 | Bierwirth | June 8, 1948 |
| 2,595,780 | Dunlap, Jr. | May 6, 1952 |

FOREIGN PATENTS

| 17,544 | Great Britain | of 1911 |
| 169,771 | Switzerland | Sept. 1, 1934 |